United States Patent
Amir et al.

(10) Patent No.: US 10,990,083 B2
(45) Date of Patent: Apr. 27, 2021

(54) SYSTEMS AND METHODS FOR CLOUD-BASED CONTROL AND DATA ACQUISITION WITH ABSTRACT STATE

(71) Applicant: THE JOHNS HOPKINS UNIVERSITY, Baltimore, MD (US)

(72) Inventors: Yair Amir, Bethesda, MD (US); Amy Babay, Bethesda, MD (US); Thomas Tantillo, Baltimore, MD (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 0 days.

(21) Appl. No.: 16/479,371

(22) PCT Filed: Jan. 26, 2018

(86) PCT No.: PCT/US2018/015451
§ 371 (c)(1),
(2) Date: Jul. 19, 2019

(87) PCT Pub. No.: WO2018/140728
PCT Pub. Date: Aug. 2, 2018

(65) Prior Publication Data
US 2019/0391567 A1    Dec. 26, 2019

Related U.S. Application Data

(60) Provisional application No. 62/451,341, filed on Jan. 27, 2017.

(51) Int. Cl.
*G06F 15/173* (2006.01)
*G05B 19/418* (2006.01)
(Continued)

(52) U.S. Cl.
CPC ....... *G05B 19/4183* (2013.01); *G05B 19/408* (2013.01); *H04L 67/12* (2013.01);
(Continued)

(58) Field of Classification Search
CPC .............. G05B 19/4183; G05B 19/408; G05B 2219/32404; G05B 2219/32406; H04L 67/12; H04L 67/2823
(Continued)

(56) References Cited

U.S. PATENT DOCUMENTS 6,067,477 A * 5/2000 Wewalaarachchi .. G05B 19/418
700/83
6,556,875 B1 * 4/2003 Nagasaka .......... H04N 1/00209
700/19

(Continued)

OTHER PUBLICATIONS

PCT International Search Report and Written Opinion dated Mar. 12, 2018 in corresponding International Application.
(Continued)

*Primary Examiner* — Alicia Baturay
(74) *Attorney, Agent, or Firm* — MH2 Technology Law Group LLP (57) ABSTRACT

Systems, computer readable media, and method concern assigning an abstraction representation to data associated with a system of the SCADA environment. The method also includes providing the abstraction representation to a control system associated with the system of the SCADA environment. The control system is implemented in a computer system. Further, the method includes receiving actual data from the system of the SCADA environment. Additionally, the method includes generating abstract data from the actual data using the abstraction representation. The method, also includes forwarding the abstract data to the control system.

20 Claims, 4 Drawing Sheets

(51) Int. Cl.
*G05B 19/408* (2006.01)
*H04L 29/08* (2006.01)

(52) U.S. Cl.
CPC .............. *H04L 67/2823* (2013.01); *G05B 2219/32404* (2013.01); *G05B 2219/32406* (2013.01)

(58) Field of Classification Search
USPC ........................................................ 709/223
See application file for complete search history.

(56) References Cited

U.S. PATENT DOCUMENTS

| | | | |
|---|---|---|---|
| 8,868,907 B2 * | 10/2014 | Graham .................. | G06F 21/00 713/164 |
| 9,401,839 B2 * | 7/2016 | Kidwell .................. | H04L 41/06 |
| 2009/0254655 A1 | 10/2009 | Kidwell et al. | |
| 2013/0151849 A1 | 6/2013 | Graham et al. | |
| 2019/0320015 A1 * | 10/2019 | Amir ....................... | H04L 69/40 |

OTHER PUBLICATIONS

Innternational Preliminary Report on Patentability in corresponding International Application PCT/US2018/015451 dated Aug. 8, 2019.

* cited by examiner

SYSTEMS AND METHODS FOR CLOUD-BASED CONTROL AND DATA ACQUISITION WITH ABSTRACT STATE

CROSS-REFERENCE TO RELATED APPLICATIONS

This application is a national stage conversion under 35 U.S.C. § 371 of PCT Application No. PCT/US2018/015451 entitled "SYSTEMS AND METHODS FOR CLOUD-BASED CONTROL AND DATA ACQUISITION WITH ABSTRACT STATE" filed Jan. 26, 2018, which claims priority to U.S. Provisional No. 62/451,341 filed Jan. 27, 2017, the entire disclosures of which are hereby incorporated by reference in their entireties.

GOVERNMENT LICENSE RIGHTS

This invention was made with government support under contract number N660001-1-2-4014 awarded by Defense Advanced Research Projects Agency (DARPA). The government has certain rights in the invention.

FIELD

This disclosure relates generally to industrial control systems, such as Supervisory Control and Data Acquisition (SCADA) systems.

BACKGROUND

Today's SCADA systems use fault-tolerance techniques in an attempt to remain available even when parts of the system fail. In particular, state-of-the-art SCADA systems use a hot backup of the SCADA master within a single control center to take over if the primary SCADA master fails. In addition, many SCADA systems use a cold-backup approach of maintaining a backup control center in a different geographic location that can be activated within a few minutes to a few hours by the SCADA system operators it the primary control center fails.

Using this approach, a SCADA system can successfully withstand a single benign failure of a single server within a control center and can restore operation after a complete control center failure with a few minutes or hours of downtime. When a control center fails as the result of a single benign problem, the few minutes or hours of downtime are likely to occur at a normal, nan-critical time, and therefore are considered acceptable today.

However, as malicious attacks become more prevalent, the assumptions that failures will generally not occur at critical times and that only benign failures need to be addressed no longer hold. For example, a sophisticated attacker can take down the primary control center at a critical moment, incurring system downtime at the worst possible time (e.g., during a major snowstorm or during a coordinated large-scale attack in multiple domains).

Switching from a cold-backup approach to a hot backup approach, where the backup control center is always active and ready to take over, does not solve the problem; network partitions (due to either benign failures or malicious attacks) can cause a split-brain problem in which both control centers believe they are the primary and try to issue control commands. Beyond this, a compromised SCADA master (in either a cold-backup or hot-backup approach) can issue incorrect commands, with devastating effects on the SCADA system.

SCADA manufacturers are considering moving SCADA systems to cloud-like settings to obtain cost, scalability, and fault-tolerance benefits. In such settings, a few large cloud SCADA providers could manage SCADA systems for many individual clients, for example, utility companies. While the cloud-based settings may lower the clients' cost, simplify management, and potentially offer new features and services, the cloud-based settings raise security and confidentiality issues.

For example, a utility company may want to keep certain sensitive information about its SCADA system private and avoid revealing those details to the cloud provider, tor instance, due to concerns about cloud data breaches or unauthorized access by other utilities using the cloud. Such sensitive information may include locations and Internet Protocol (IP) addresses (or other communication/access methods) of field sites and Remote Terminal Units (RTUs), and may include potentially other types of data.

SUMMARY

Aspects of the present disclosure concern a method that includes assigning an abstraction representation to data associated with a system of the SCADA environment. The method also includes providing the abstraction representation to a control system associated with the system of the SCADA environment. The control system is implemented in a computer system. Further, the method includes receiving actual data from the system of the SCADA environment. Additionally, the method includes generating abstract data from the actual data using the abstraction representation. The method also includes forwarding the abstract data to the control system.

Additional aspects of the present disclosure concern a system that includes one or more memory devices storing instructions, and one or more processors coupled to the one or more memory devices and configured to execute the instructions to perform a method. The method includes assigning an abstraction representation to data associated with a system of the SCADA environment. The method also includes providing the abstraction representation to a control system associated with the system of the SCADA environment. The control system is implemented in a computer system. Further, the method includes receiving actual data from the system of the SCADA environment. Additionally, the method includes generating abstract data from the actual data using the abstraction representation. The method also includes forwarding the abstract data to the control system.

Additional aspects of the present disclosure concern a non-transitory computer readable medium storing instructions for causing one or more processors to perform a method. The method includes assigning an abstraction representation to data associated with a system of the SCADA environment. The method also includes providing the abstraction representation to a control system associated with the system of the SCADA environment. The control system is implemented in a computer system. Further, the method includes receiving actual data from the system of the SCADA environment. Additionally, the method includes generating abstract data from the actual data using the abstraction representation. The method also includes forwarding the abstract data to the control system.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Logical and structural changes can be made to the examples of the various implementations without departing from the spirit and scope of the present teachings. The following detailed description is, therefore, not to be taken in a limiting sense and the scope of the present teachings is defined by the appended claims and their equivalents.

Aspects of the present disclosure relate to systems and methods that leverage the benefits of cloud-based systems without revealing sensitive information. In aspects, SCADA data can be provided to cloud-based systems using abstract representations. The SCADA data can include network and access information for the field sites and RTUs (e.g., IP address, Media Access Control (MAC) information, network domain information, login information, etc.), command data, and collected data. For example, instead of storing network address in the cloud-based systems, the systems of the SCADA under control of a master or proxy (e.g., control systems, programmable logic controllers (PLCs), RTUs, etc.) can assign logical addresses to the field sites and remote units. The cloud-based systems only have access to the logical addresses and operate using only the logical addresses. Only the systems under control of a client can translate the logical addresses back into physical addresses and issue control commands to the correct remote units.

By using abstract representations, the SCADA systems can utilize cloud-based systems without concerns of sensitive information being released. Additionally, by securing data communication, cloud-based systems can be leveraged in order to increase processing power and efficiency while reducing cost.

Figure 1A:
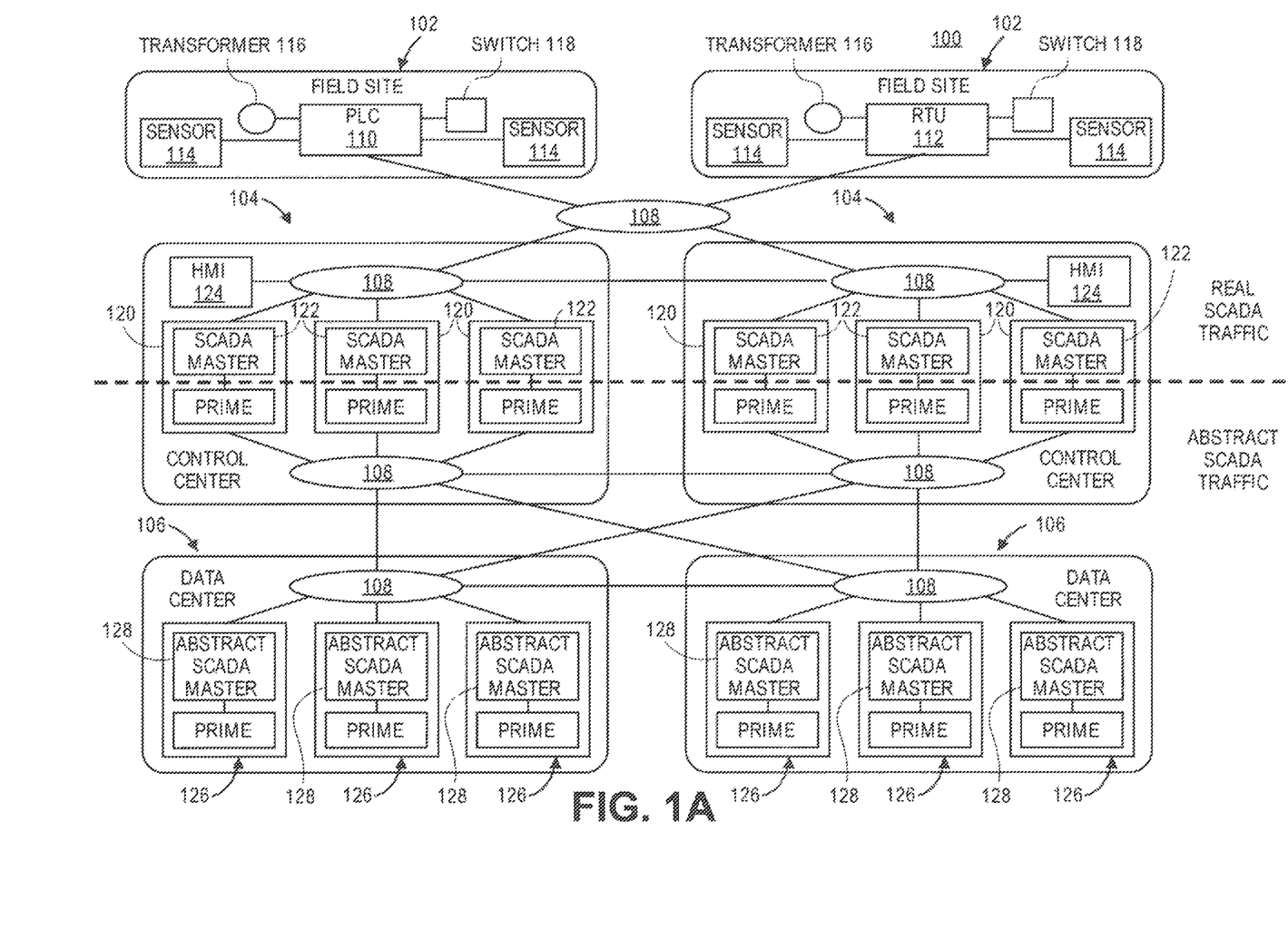
FIGS. 1A and 1B illustrates examples of a SCADA environment, according to various aspects of the present disclosure.

FIG. 1A illustrates an example a SCADA environment 100 in which cloud-based systems can be securely utilized, according to aspects of the present disclosure. While FIG. 1A illustrates various components contained in the SCADA environment 100, FIG. 1A illustrates one example of a SCADA environment and additional components can be added and existing components can be removed.

As illustrated in FIG. 1, the SCADA environment 100 can includes one or more field sites 102, one or more control centers 104, and one or more data centers 106. (Throughout this disclosure, the terms "site" and "center" can be used interchangeably.) The field sites 102, the control centers 104, and the data centers 106 may be coupled by one or more networks 108. The networks 108 can be any type of network whether public or private. For example, the networks 108 can include one or more public local area networks, one or more private local area networks, one or more public wide area networks, one or more private wide area networks, specialized networks connecting the control centers 104 to the field sites 102, and combinations thereof.

The field sites 102 and the control centers 104 can represent the computer systems, hardware systems, and network hardware of public or private entities, such as governmental agencies, individuals, businesses, partnerships, companies, corporations, etc., that provide services. For example, the field sites 102 and the control centers 104 can represent the systems of a utility company.

The field sites 102 can include hardware and software to support the operations of the SCADA environment 100. For instance, the field sites 102 can be field sites for a utility company that provide power offered by the utility company. For example, the field sites 102 can include PLC devices 110, RTU devices 112, sensors 114, transformers 116, switches 118, and the like.

The control centers 104 can be configured to provide interfaces and controls for the field sites 102. The control centers 104 can include one or more computer systems 120. The one or more computer systems 120 can include physical computer systems, virtual machines, or combination thereof. The computer systems 120 can be any type of conventional computer system that is operating in the SCADA environment 100 or supporting the SCADA environment 100. For example, the computer system 120 can include various types of servers, such as file servers, web servers, application servers, database servers, email servers and the like, that provide services within the SCADA environment 100. Likewise, for example, the computer system 120 can include laptop computers, desktop computers, tablet computers, mobile phones, and the like used by the personnel of the entities.

The computer systems 120 of the control centers 104 can be configured to execute one or more SCADA masters 122. The SCADA masters 122 can be configured to control the operation of the hardware and software of the field sites 102 and to provide an interface to interact with the hardware and software of the field sites 102. The SCADA masters 122 can be configured as a software program that is capable of being stored on and executed by the computer system 120. The SCADA masters 122 can be written in a variety of programming languages, such as JAVA, C++, Python code, Visual Basic, hypertext markup language (HTML), extensible markup language (XML), and the like to accommodate a variety of operating systems, computing system architectures, etc. Additionally, the functionality of the SCADA masters 122 can be implemented in a combination of software programs and specialized hardware devices.

The SCADA masters 122 can be configured to operate and control the hardware and software of the field sites 102. For example, the SCADA masters 122 can be configured to send commands and instructions to the hardware and software (e.g., transformers 116, switches 118, etc.) of the field sites 102 to control operation of the hardware and software. Likewise, the SCADA masters 122 can be configured to receive data from the hardware and software of the field sites 102 and process the data. For example, the SCADA masters 122 can be configured to receive data from the sensors 114 that represents the state and operation of the hardware and software of the field sites 102 and process the data. Based on the data, the SCADA masters 122 can be configured to modify or control the operation of the field sites 102.

The SCADA masters 122 can be configured to autonomously or semi-autonomously control the operation of the field sites 102. Likewise, the SCADA masters 122 can be configured to operate, at least partially, under the control of a user. The SCADA masters 122 can be configured to generate and provide one or more user interfaces 124 (e.g., human machine interfaces (HMIs)) to receive input from a user and to provide output to the user. The user interfaces 124 can be any type of command line and/or graphical user interface (GUI) that allows the user to interact with the SCADA masters 122. The SCADA masters 122 can be configured to provide, via the user interface 124, controls, forms, reports, etc., to allow the user to interact with the SCADA masters 122 and perform the processes described herein.

The data centers 106 can be configured to provide computer services and/or cloud-based services to the SCADA environment 100. The data centers 106 can represent the computer systems, hardware systems, and network hardware of public or private entities, such as governmental agencies, individuals, businesses, partnerships, companies, corporations, etc., that provide cloud-based services. For example, the data centers 106 can represent the systems of a commercial cloud provider, for example, Amazon™.

The data centers 106 can be configured to operate one or more computer systems 126. The one or more computer systems 126 can include physical computer systems, virtual machines, or combination thereof. As described herein, virtual machines can be any software implementation of a machine or computer that can execute a program or application using underlying hardware of the data centers 106. The virtual machines can be a system virtual machine capable of executing a complete operating system (OS) or process virtual machine capable of executing one or more programs or applications. It should be appreciated that the number, type, functionality, and extent of each of the virtual machine can vary based on the underlying hardware of the virtual machines, any requirements, or other factors. The data centers 106 can also include a virtualization manager to manage the virtual machines. The virtualization manager can be a software entity, application, module, application programming interface (API), or any component or combination of hardware resources, that can be configured to build, scale, instantiate, manage, and/or otherwise interface with a network of physical and virtual machines.

The computer systems 126 can be configured to implement one or more abstract SCADA masters 128. The abstract SCADA masters 128 can be configured to operate and provide the functionality of the SCADA masters 122 described above. For example, the abstract SCADA masters 128 can operate as the primary SCADA masters for the SCADA environment 100, can operate as backup SCADA masters, and combination thereof, and/or can participate in an active replication protocol with the control center SCADA masters 122.

Additionally, for example, the SCADA environment 100 includes other hardware and computer systems that support the SCADA environment 100. For example, the SCADA environment 100 can include gateways, routers, wireless access points, firewalls, and the like that support any type of communications network to allow the computing systems in the SCADA environment 100 to communicate. In any of the examples, the computer systems, including the computer system 120, in the SCADA environment 100 include hardware resources, such as processors, memory, network hardware, storage devices, and the like, and software resources, such as operating systems (OS), application programs, and the like.

In aspects, the SCADA masters 122 of the control center 104 can provide an abstraction layer to traffic flowing between the hardware and software of the field sites 102 and the abstract SCADA masters 128 of the data centers 106. This controls sensitive information from being disclosed to outside parties who may have access to the cloud-based services provided by the data centers 106. The SCADA masters 122 can be configured to control the SCADA data transferred between the field sites 102 and the data centers 106 using abstract representations. The abstract representations allow actual data from the field sites 102 to be transformed to abstract data before being sent to the data centers 106. For example, the SCADA data can include network and access information for hardware and software of the field sites 102 (e.g., IP address, MAC information, network domain information, login information, etc.), command data, and collected data. For example, instead of using physical network address in the data centers 106, the SCADA masters 122 can assign logical addresses to the hardware and software of the field sites 102 (e.g., PLCs and RTUs). As traffic flows between the field sites 102 and data centers 106, the SCADA masters 122 can translate the logical addresses back into physical addresses (and vice versa) as the traffic flows through the SCADA masters 122.

In another example, the abstract representation can transform the commands and instructions sent to the field sites 102 and the captured data transferred between the hardware and software of the field systems 102 and the abstract SCADA masters 128. For example, the SCADA masters 122 can translate the data received from the field sites (e.g., state information, sensor readings, etc.) into abstract data and forward the abstract data to the abstract SCADA masters 128. In this example, the abstract SCADA masters 128 can be configured to operate using the abstract data. Similarly, the abstract SCADA masters 128 can be configured to send back abstract data representing commands to the hardware and software of the field sites 102 (e.g., commands and instructions). In this example, the SCADA masters 122 can be configured to translate the abstract data back to the actual commands and instructions.

In aspects, the SCADA masters 122 and the abstract SCADA masters 128 can also provide fault-tolerant or intrusion-tolerant primary and backup operations. For example, the SCADA masters 122 and the abstract SCADA masters 128 can provide primary operations, backup operations, and active replication. For example, the SCADA masters 122 and the abstract SCADA masters 128 can perform fault-tolerant or intrusion-tolerant primary and backup operations as well as active replication, as disclosed in U.S. Provisional Application No. 62/353,256, filed Jun. 22, 2016, entitled "Network-attack-resilient intrusion-tolerant SCADA architecture." For example, the SCADA masters 122 and the abstract SCADA masters 128 can utilize fault-tolerant or intrusion-tolerant protocols to agree on abstract operations, for example, operation using logical addressees. In one example, if at least one SCADA master 122 is correct and available, the protocol can determine if a threshold number of the SCADA master 122 and the abstract SCADA masters 128 agree on the command or instruction issued by the SCADA master 122 or the abstract SCADA master 128. If the threshold number of the SCADA master 122 and the abstract SCADA masters 128 agree, the SCADA master 122 can translate the abstract representations and forward the command or instruction to appropriate hardware or software of the field sites 102.

Figure 1B:
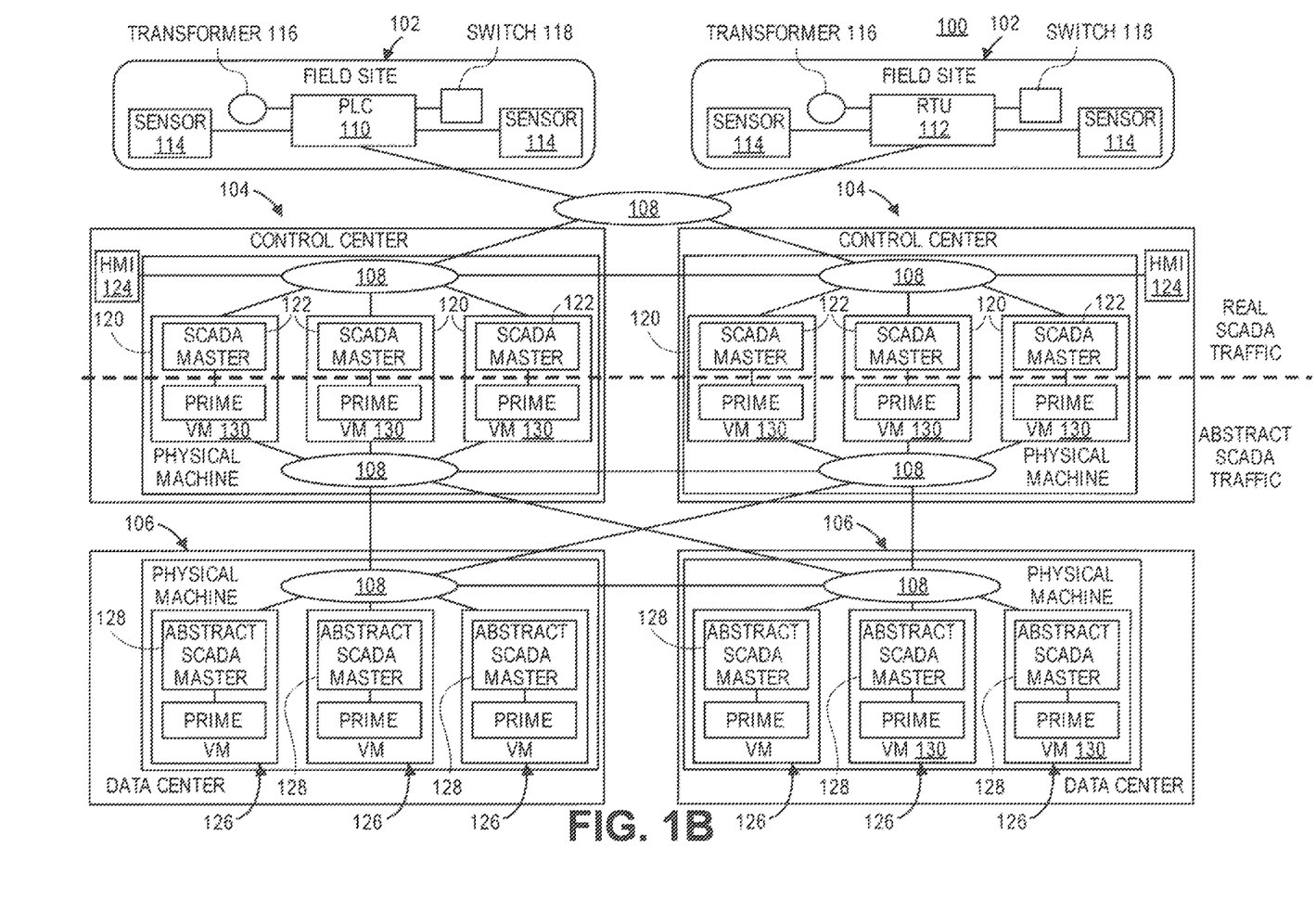

FIG. 1B illustrates an example a SCADA environment 100 in which cloud-based systems can be securely utilized, according to aspects of the present disclosure. While FIG. 1B illustrates various components contained in the SCADA environment 100. FIG. 1B illustrates one example of a SCADA environment and additional components can be added and existing components can be removed.

As illustrated in FIG. 1B, the SCADA environment 100 can include some or all of the systems described in FIG. 1A. The common systems of FIG. 1B can operate as described above with reference to FIG. 1A. Additionally, in this example, one or more of the computer system 120 can implement one or more virtual machines 130. Likewise, in this example, the one or more computer systems 126 can implement one or more virtual machines 130. The virtual machines 130 can be configured to operate one or more of the SCADA masters 122, one or more of the abstract SCADA masters 128, or combinations thereof. The SCADA masters 122 can operate to perform the process described above and below. By using virtual machines in the control center 104, the physical computer resources needed to operate the control center 104 can be reduced. While FIG. 1B illustrates the control centers 104 and the data centers 106 implementing the SCADA masters on one or more virtual machines, in any example, the control centers 104 and the data centers 106, can implement the SCADA masters on physical computer systems, virtual machines, and combinations thereof.

In the SCADA environment 100 described above, the SCADA masters 122 can be configured to perform the abstraction processes described herein. In another example, one or more standalone proxies can be utilized to perform the abstraction process described herein. As disclosed herein, a proxy can be configured as hardware, software, or combination thereof that performs the abstraction processes. The proxy can be a standalone system that is located in the control center 104, the field sites 102, or any other site operated by the entity associated with the field sites 102 and the control center 104. Additionally, the proxy can be incorporated into another system of the control center 104, the field sites 102, or any other site operated by the entity associated with the field sites 102 and the control center 104. For example, the proxy can be incorporated into the hardware and software to support the operations of the field sites 102 (e.g. PLCs and RTUs).

In aspects, the one or more proxies can be configured to perform fault-tolerant or intrusion-tolerant protocols to agree on abstract operations, for example, operation using logical addressees. In one example, as described above, if at least one SCADA master 122 is correct and available, the protocol can determine if a threshold number of the SCADA master 122 and the abstract SCADA masters 128 agree on the command or instruction issued by the SCADA master 122 or the abstract SCADA master 128. If the threshold number of the SCADA master 122 and the abstract SCADA masters 128 agree, the proxy can translate allow the command or instruction to appropriate hardware or software of the field sites 102.

In another example, the one or more proxies can verify that the abstraction was performed correctly. For example, when an abstract representation is received, the proxy can translate the abstract representation and verify the abstraction was correctly performed. For example, if a logical address is used, the proxy can translate the logical address and verify the data is received from or directed to the appropriate hardware or software of the field site 102.

Figure 2:
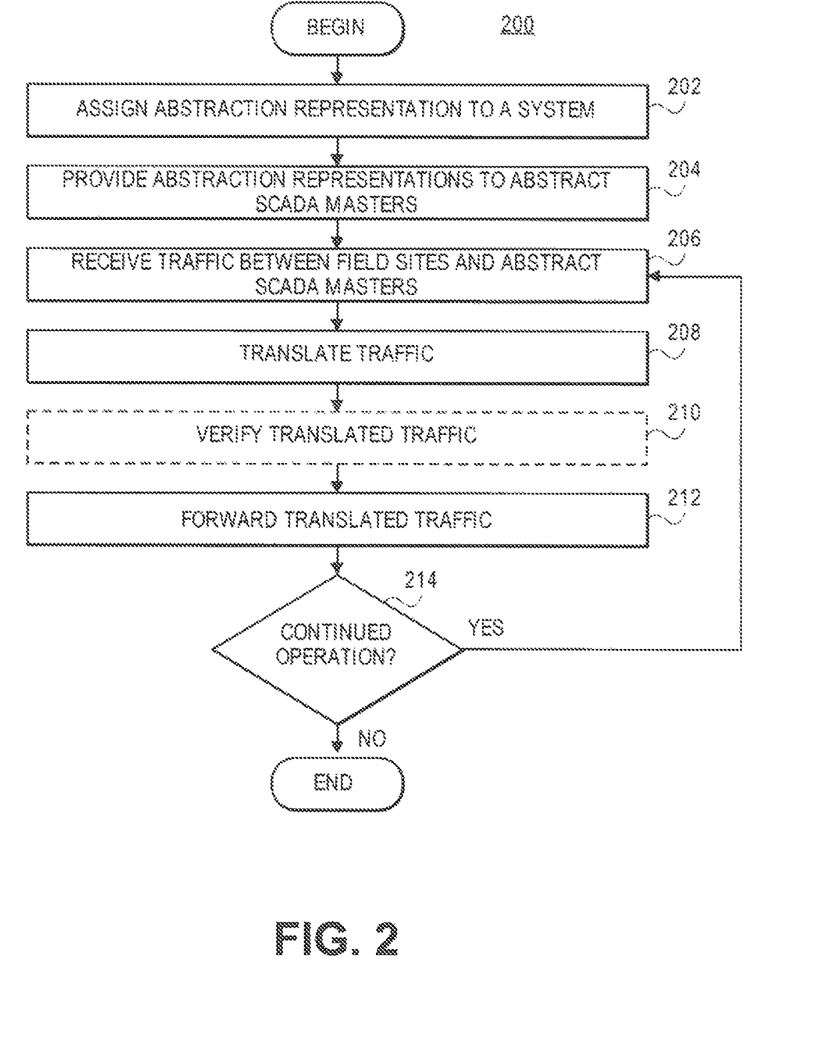
FIG. 2 illustrates an example of process of abstracting communication in a SCADA environment, according to various aspects of the present disclosure.

FIG. 2 illustrates an example of a process 200 for performing abstraction in a SCADA environment, according to aspects of the present disclosure. While FIG. 2 illustrates various stages that can be performed, stages can be removed and additional stages can be added. Likewise, the order of the illustrated stages can be performed in any order.

After the process begins, in 202, an abstraction representation is assigned to a system in the SCADA environment. The abstraction representation can be used to translate the SCADA data transferred between the field sites 102 and the data centers 106 into abstract data. For example, the SCADA data can include network and access information for hardware and software of the field sites 102 (e.g., IP address, MAC information, network domain information, login information, etc.), command data, and collected data.

In one example, the abstraction representation can be assigned by the SCADA masters 122. In another example, the abstraction representation can be assigned by the proxies.

In 204, the abstraction representation is provided to abstract SCADA masters. In one example, if the abstraction representation is associated with a physical network address, the logical network address can be provided to the abstract SCADA masters 128. In another example, it the abstraction representation is associated with actual data, algorithm or protocols that interpret the abstract data can be provided to the abstract SCADA masters 128. As such, the abstract SCADA masters 128 can operate on the abstract data without having the actual data.

In 206, traffic between the field sites and the abstract SCADA masters is received. For example, as data is sent from the field sites 102 to the abstract SCADA masters 128, the SCADA masters 122 (and/or proxies) can intercept the data. The data can include collected data from the hardware and software of the field sites 102. The data can also include command data from the abstract SCADA masters 128 to the hardware and software of the field sites 102.

In 208, the traffic is translated. For example, as data is sent from the field sites 102 to the abstract SCADA masters 128, the SCADA masters 122 (and/or proxies) can translate the data using the abstraction representations.

In one example, instead of using physical network address in the data centers 106, the SCADA masters 122 (and/or proxies) can assign logical addresses to the hardware and software of the field sites 102 (e.g., PLCs and RTUs). As traffic flows between the field sites 102 and data centers 106, the SCADA masters 122 (and or proxies) can translate the logical addresses back into physical addresses (and vice versa) as the traffic flow through the SCADA masters 122 (and/or proxies).

In another example, the abstract representation can transform the commands and instructions being sent to the field sites 102 being and the captured data being transferred between the hardware and software of the field systems 102 and the abstract SCADA masters 128. For example, the SCADA masters 122 (and/or proxies) can translate the data received from the field sites (e.g., state information, sensor readings, etc.) into abstract data and forward the abstract data to the abstract SCADA masters 128. In this example, the abstract SCADA masters 128 can be configured to operate using the abstract data. Similarly, the abstract SCADA masters 128 can be configured to send back abstract data representing commands to the hardware and software of the field sites 102 (e.g., commands and instructions). In this example, the SCADA masters 122 (and/or proxies) can be configured to translate the abstract data back to the actual commands and instructions.

In 210, the translated traffic can be optionally verified. For example, the SCADA masters 122 (and/or proxies) can apply fault-tolerant or intrusion-tolerant protocols to agree on abstract operations.

In 212, the translated traffic is forwarded. For example, the SCADA masters 128 (and/or proxies) can transfer the data to and from the hardware and software of the field sites 102 to the abstract SCADA masters 128 (or vice versa) depending on the flow of the traffic.

In 214, it can be determined if operations are to continue. If operations continue, the process 200 can return to 206 and continue with the abstraction processes. If operations are complete, the process 200 can end.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 3:
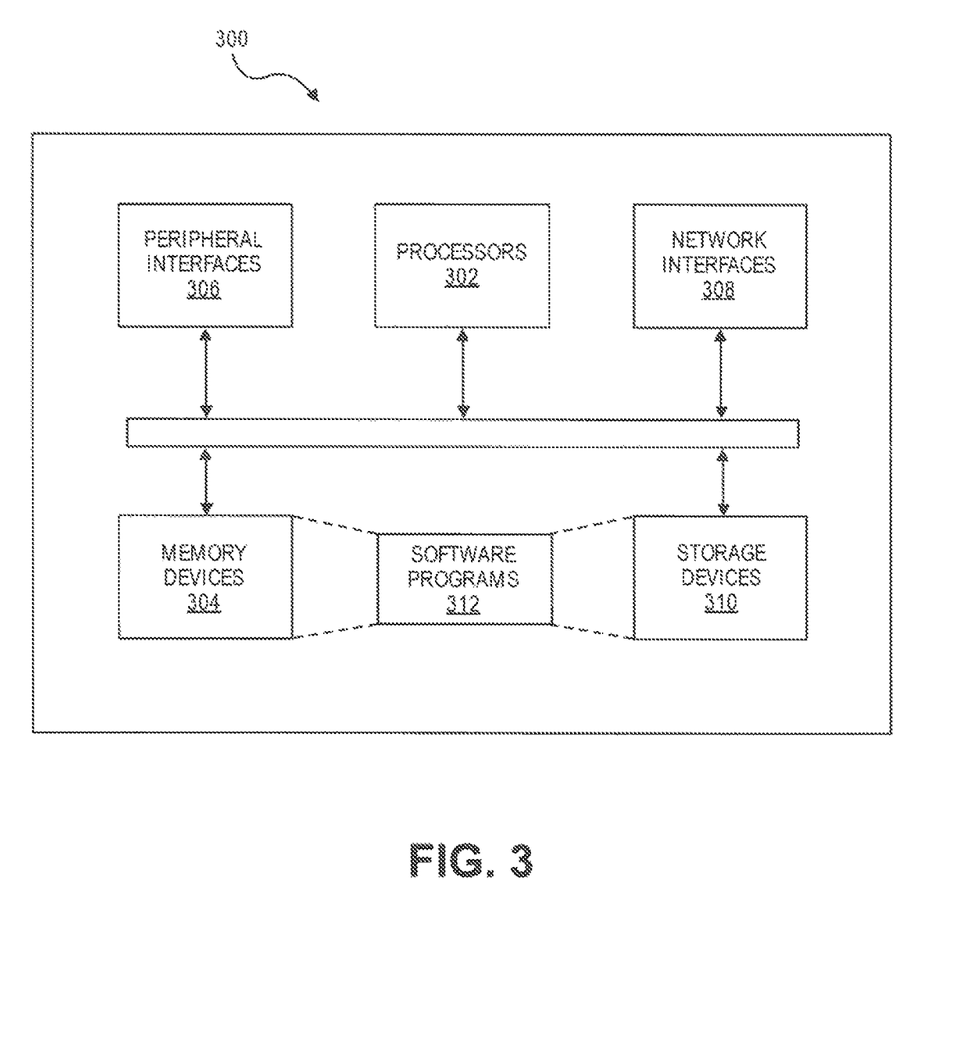
FIG. 3 illustrates an example of a hardware configuration for a computer device, according to various aspects of the present disclosure.

For example, FIG. 3 illustrates an example of a hardware configuration for the computer system 120, the proxies, or another other computer resource in the SCADA environment 100. While FIG. 3 illustrates various components contained in the computer device 300, FIG. 3 illustrates one example of a computer device and additional components can be added and existing components can be removed.

The computer device 300 can be any type of computer device. As illustrated in FIG. 3, the computer device 300 can include one or more processors 302 of varying core configurations and clock frequencies. The computer device 300 can also include one or more memory devices 304 that serve as a main memory during the operation of the computer device 300. For example, during operation, a copy of the software that supports the abstraction operations can be stored in the one or more memory devices 304. The computer device 300 can also include one or more peripheral interfaces 306, such as keyboards, mice, touchpads, computer screens, touchscreens, etc., for enabling human interaction with and manipulation of the computer device 300. The computer device 300 can also include one or more network interfaces 308 for communicating via one or more networks, for example the network 108, such as Ethernet adapters, wireless transceivers, or serial network components, for communicating over wired or wireless media using protocols. The computer device 300 can also include one or more storage devices 310 of varying physical dimensions and storage capacities, such as flash drives, hard drives, random access memory, etc., for storing data, such as images, files, and program instructions for execution by the one or more processors 302.

Additionally, the computer device 300 can include one or more software programs 312 that enable the functionality of the abstraction processes described above. The one or more software programs 312 can include instructions that cause the one or more processors 302 to perform the processes described herein. Copies of the one or more software programs 312 can be stored in the one or more memory devices 304 and or on in the one or more storage devices 310. Likewise, the data utilized by one or more software programs 312 can be stored in the one or more memory devices 304 and/or on in the one or more storage devices 310.

The computer device 300 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network (SAN) familiar to those skilled in the art. Similarly, any necessary files for performing the functions attributed to the computers, servers, or other network devices may be stored locally and/or remotely, as appropriate.

In implementations, the components of the computer device 300 as described above need not be enclosed within a single enclosure or even located in close proximity to one another. Those skilled in the art will appreciate that the above-described componentry are examples only, as the computer device 300 can include any type of hardware componentry, including any necessary accompanying firmware or software, for performing the disclosed implementations. The computer device 300 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise a random access memory (RAM), a read only memory (ROM), a flash memory, an electrically erasable programmable read only memory (EEPROM), a compact disc read only memory (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

What is claimed is:

1. A method for operating a supervisory control, and data acquisition (SCADA) environment, comprising:
    assigning an abstraction representation to data associated with a system of the SCADA environment;
    providing the abstraction representation to a control system associated with the system of the SCADA environment, wherein the control system is implemented in a computer system;
    receiving, actual data from the system of the SCADA environment;
    generating abstract data from the actual data using the abstraction representation;
    forwarding the abstract data to the control system;
    receiving new abstract data from the control system implemented in the computer system;
    translating the new abstract data into new actual data using the abstraction, representation; and
    forwarding the new actual data to the system of the SCADA environment.
2. The method of claim 1, the method further comprising;
    determining that additional actual data from a threshold number of additional control systems match the new actual data.
3. The method of claim 1, the method further comprising:
    verifying, that the translation of the new abstract data into new actual data was correct.
4. The method of claim 1, wherein the system of the SCADA environment comprises at least one of a programmable logic controller and a remote terminal unit.
5. The method of claim 1, wherein the data associated with the system of the SCADA environment comprises a physical network address of the system and the abstraction representation comprises a logical network address of the system.
6. The method of claim 1, wherein the computer system comprises a physical computer, a virtual machine, or combination thereof.
7. The method of claim 1, wherein generating the abstract data is performed by a SCADA master or a proxy.
8. A system, comprising:
    one or more memory devices storing instructions; and
    one or more processors coupled to the one or more memory devices and configured to execute, the instructions to perform a method comprising:
    assigning an abstraction representation to data associated with a system of a SCADA environment;
    providing the abstraction representation to a control system associated with the system of the SCADA environment, wherein the control system is implemented in a computer system;
    receiving actual data from the system of the SCADA environment;
    generating abstract data from the actual data using the abstraction representation;
    forwarding the abstract data to the control system;
    receiving new abstract data from the control system implemented in the computer system: translating the new abstract data: into new actual data using the abstraction representation; and
    forwarding the new actual data to the system of the SCADA environment.
9. The system of claim 8, the method further comprising:
    determining that additional actual data from a threshold number of additional control systems: match the new actual data.
10. The system of claim 8, the method further comprising:
    verifying that the translation of the new abstract data into new actual data was correct.
11. The system of claim 8, wherein the system of the SCADA environment comprises at least one of a programmable logic controller and a remote terminal unit.
12. The system of claim 8, wherein the data associated with the system of the SCADA environment comprises a physical network address of the system and the abstraction representation comprises a logical, network address of the system.
13. The system of claim 8, wherein the one or more memory devices storing instructions and the one or more processors are part of a proxy.
14. A non-transitory computer readable medium storing instructions for causing one or more processors to perform a method, the method comprising:
    assigning; an abstraction representation to data associated with a system of the SCADA environment;
    providing the abstraction representation to a control system associated with the system of the SCADA environment, wherein the control system is implemented in a computer system;
    receiving actual data from the system of the SCADA environment;
    generating abstract data from the actual data using the abstraction representation;
    forwarding the abstract data, to the control system;
    receiving new abstract data from the control system implemented in the computer system;
    translating the new abstract data-into new actual data using the abstraction representation; and
    forwarding the new actual data to the system of the SCADA environment.
15. The non-transitory computer readable medium of claim 14, the method further comprising:

determining that additional actual data from a threshold number of additional control systems match the: new actual data.

16. Thu non-transitory computer readable medium, of claim 14, the method further comprising;
verifying that the translation of the new abstract data into new actual data was correct.

17. The non-transitory computer readable medium of claim 14, wherein the system of the SCADA environment comprises at least one of a programmable logic controller and a remote terminal unit.

18. The non-transitory computer readable medium of claim 14, wherein the data associated with the system of the SCADA environment comprises a physical network address of the system and the abstraction representation comprises a logical network address of the system.

19. The non-transitory computer readable medium of claim 14, wherein the computer system comprises a physical computer, a virtual machine, or combination, thereof.

20. The non-transitory computer readable medium of claim 14, wherein generating the abstract data is performed by a SCADA master or a proxy.

* * * * *

UNITED STATES PATENT AND TRADEMARK OFFICE
CERTIFICATE OF CORRECTION

PATENT NO. : 10,990,083 B2
APPLICATION NO. : 16/479371
DATED : April 27, 2021
INVENTOR(S) : Yair Amir et al.

Page 1 of 1

It is certified that error appears in the above-identified patent and that said Letters Patent is hereby corrected as shown below:

In the Claims

In Claim 1, please replace with the following claim:
1. A method for operating a supervisory control, and data acquisition (SCADA) environment, comprising:
    assigning an abstraction representation to data associated with a system of the SCADA environment;
    providing the abstraction representation to a control system associated with the system of the SCADA environment, wherein the control system is implemented in a computer system;
    receiving, actual data from the system of the SCADA environment;
    generating abstract data from the actual data using the abstraction representation;
    forwarding the abstract data to the control system;
    receiving new abstract data from the control system implemented in the computer system;
    translating the new abstract data into new actual data using the abstraction representation; and
forwarding the new actual data to the system of the SCADA environment.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*